(12) United States Patent
Engelmann

(10) Patent No.: US 7,965,197 B1
(45) Date of Patent: Jun. 21, 2011

(54) VEHICLE BLIND SPOT OCCUPATION WARNING SYSTEM

(76) Inventor: Eric D. Engelmann, Jacksonville, IL (US)

(*) Notice: Subject to any disclaimer, the term of this patent is extended or adjusted under 35 U.S.C. 154(b) by 484 days.

(21) Appl. No.: 12/012,807

(22) Filed: Feb. 7, 2008

(51) Int. Cl.
*G08G 1/16* (2006.01)
(52) U.S. Cl. .................. 340/903; 340/441; 340/437
(58) Field of Classification Search .......... 340/903, 340/933, 942–943, 437–439, 441, 445–436; 701/1, 96, 300
See application file for complete search history.

(56) References Cited

U.S. PATENT DOCUMENTS

| | | | |
|---|---|---|---|
| 3,697,985 A * | 10/1972 | Faris et al. ............. | 342/72 |
| D280,607 S | 9/1985 | Denton et al. | |
| 5,325,096 A | 6/1994 | Pakett | |
| 6,184,782 B1 * | 2/2001 | Oda et al. ............. | 340/435 |
| 6,470,273 B2 * | 10/2002 | Halsted et al. ............. | 701/301 |
| 6,753,766 B2 * | 6/2004 | Patchell ............. | 340/436 |
| 6,803,858 B2 | 10/2004 | Whitted | |
| 7,148,482 B2 * | 12/2006 | Harter, Jr. ............. | 250/353 |
| 7,342,707 B2 * | 3/2008 | Roberts et al. ............. | 359/267 |
| 2002/0067286 A1 * | 6/2002 | Hsu et al. ............. | 340/901 |
| 2002/0113873 A1 * | 8/2002 | Williams ............. | 348/118 |
| 2002/0135907 A1 * | 9/2002 | Valentino ............. | 359/844 |
| 2004/0114384 A1 | 6/2004 | Carter et al. | |
| 2005/0275514 A1 | 12/2005 | Roberts | |
| 2006/0006988 A1 | 1/2006 | Harter, Jr. et al. | |
| 2006/0185918 A1 * | 8/2006 | Kushida et al. ............. | 180/167 |

* cited by examiner

*Primary Examiner* — Daniel Previl

(57) ABSTRACT

A vehicle blind spot occupation warning system includes a vehicle that has a front end, a rear end, a first lateral side and a second lateral side. A first rear view mirror is mounted on the first lateral side and a second rear view mirror is mounted on the second lateral side. A pair of heat detecting sensors is provided. Each of the first and second lateral sides has one of the sensors attached thereto and the sensors are positioned adjacent to the rear end. The heat detecting sensors detect heat from vehicles positioned at least within 30 feet laterally and rearwardly of the first and second lateral sides. At least one light emitter is in communication with the heat detecting sensors and emits light when the first or second sensor detects heat.

10 Claims, 5 Drawing Sheets

VEHICLE BLIND SPOT OCCUPATION WARNING SYSTEM

BACKGROUND OF THE INVENTION

Field of the Invention

The present invention relates to vehicle proximity warning devices and more particularly pertains to a new vehicle proximity warning device for warning a driver that another vehicle is positioned in the driver's blind spots so that the driver does not accidentally change lanes and strike the other vehicle.

SUMMARY OF THE INVENTION

The present invention meets the needs presented above by generally comprising a vehicle that has a front end, a rear end, a first lateral side and a second lateral side. A first rear view mirror is mounted on the first lateral side and a second rear view mirror is mounted on the second lateral side. A pair of heat detecting sensors is provided. Each of the first and second lateral sides has one of the sensors attached thereto and the sensors are positioned adjacent to the rear end. The heat detecting sensors detect heat from vehicles positioned at least within 30 feet laterally and rearwardly of the first and second lateral sides. At least one light emitter is in communication with the heat detecting sensors and emits light when the first or second sensor detects heat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
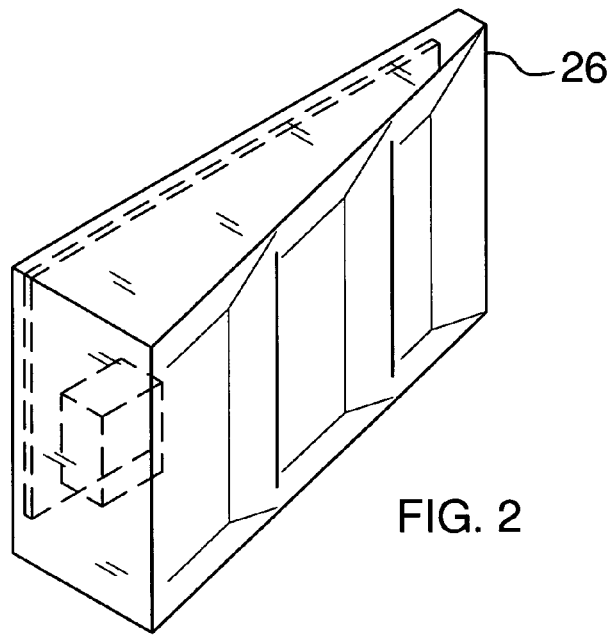
FIG. 2 is a front perspective view of a heat detecting sensor of the present invention.
Figure 1:
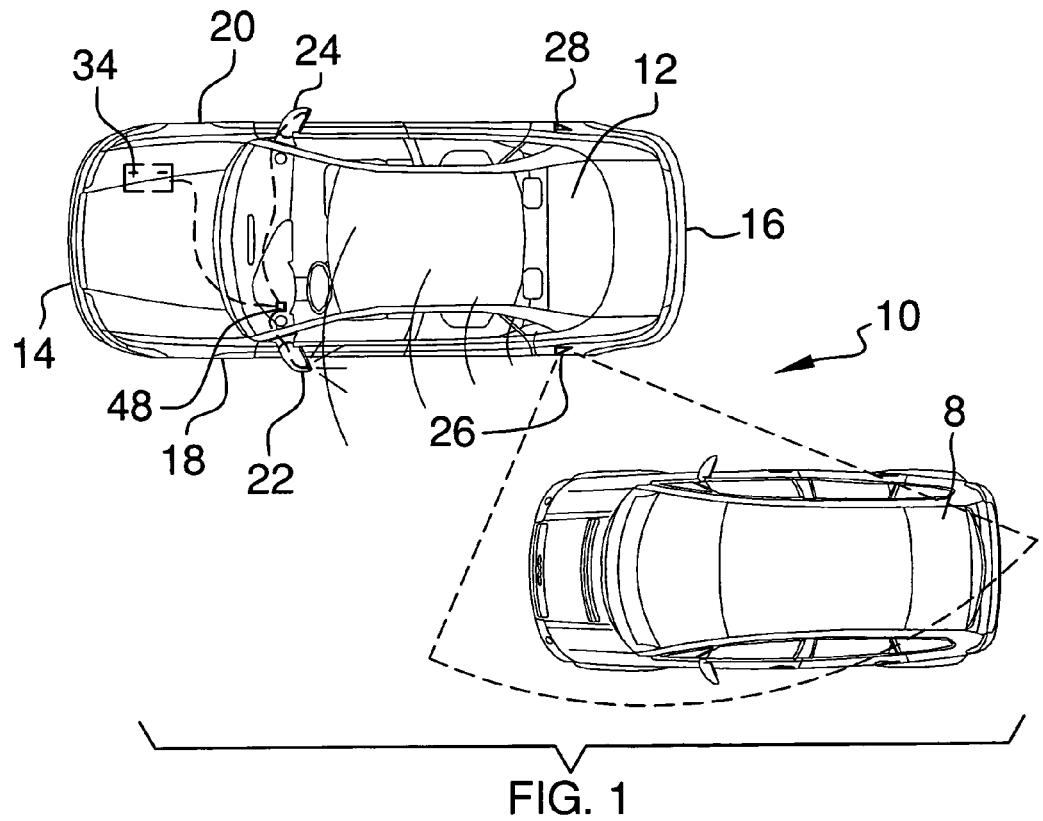
FIG. 1 is a top view of a vehicle blind spot occupation warning system according to the present invention.
Figure 3:
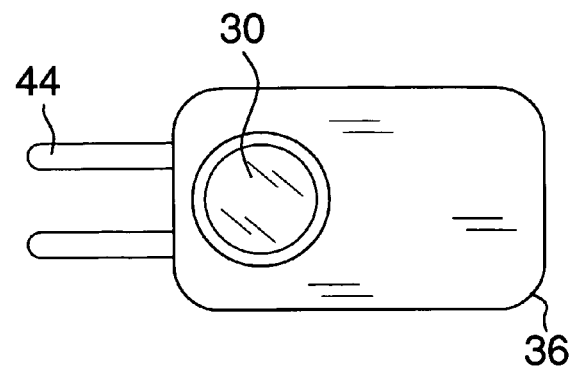
FIG. 3 is a front view of a light emitter of the present invention.
Figure 4:
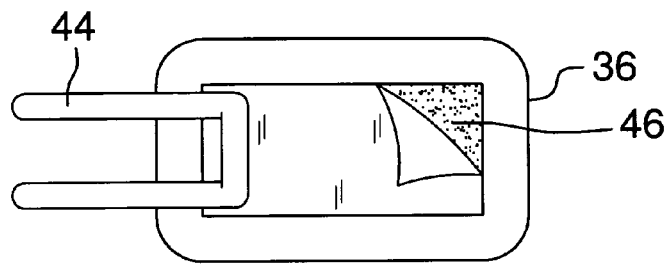
FIG. 4 is a back view of the light emitter of the present invention.
Figure 5:
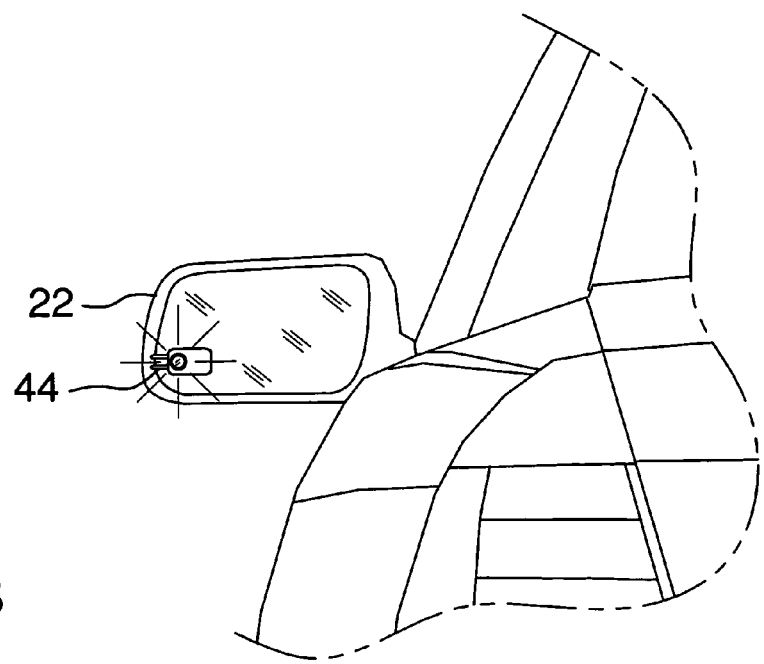
FIG. 5 is a front in-use view of the present invention.
Figure 6:
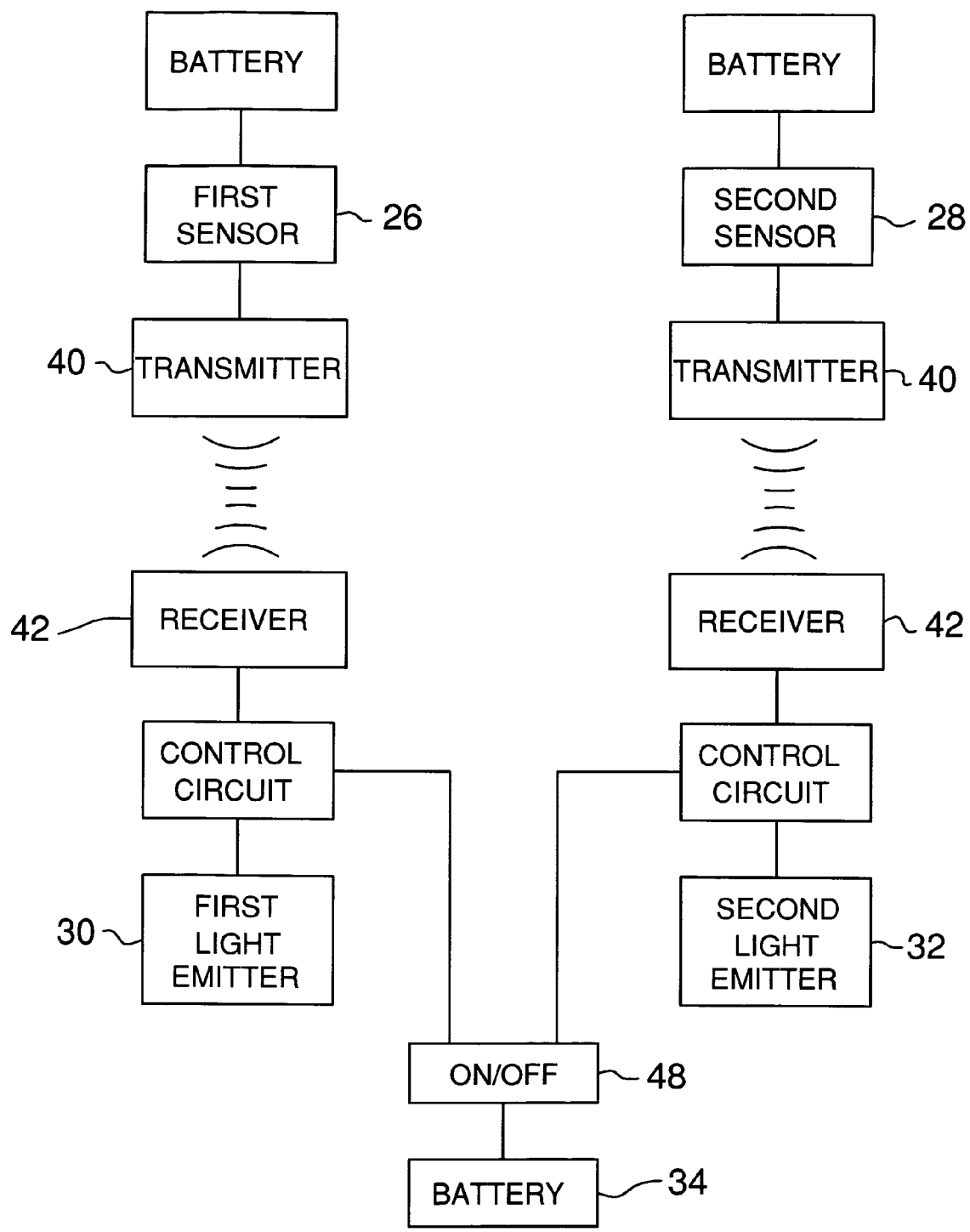
FIG. 6 is a schematic view of the present invention.
Figure 7:
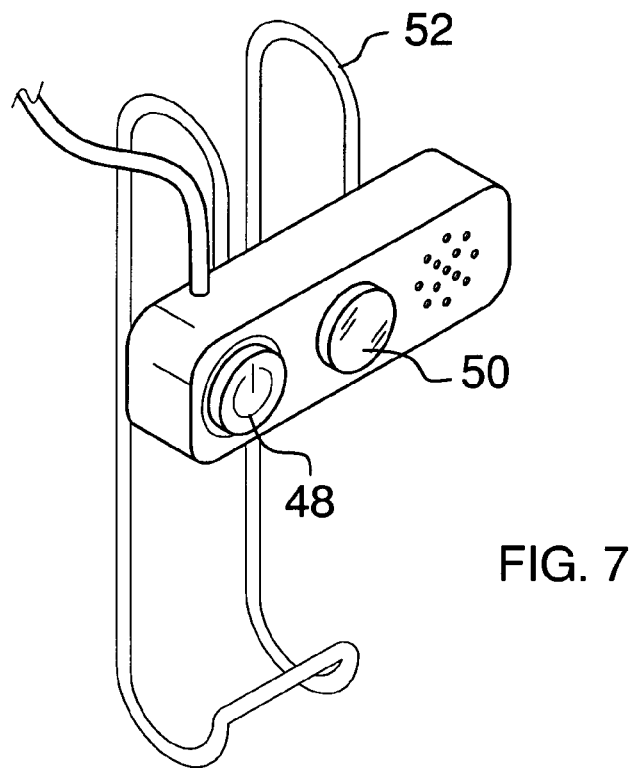
FIG. 7 is a front perspective view of a second embodiment of the present invention.
Figure 8:
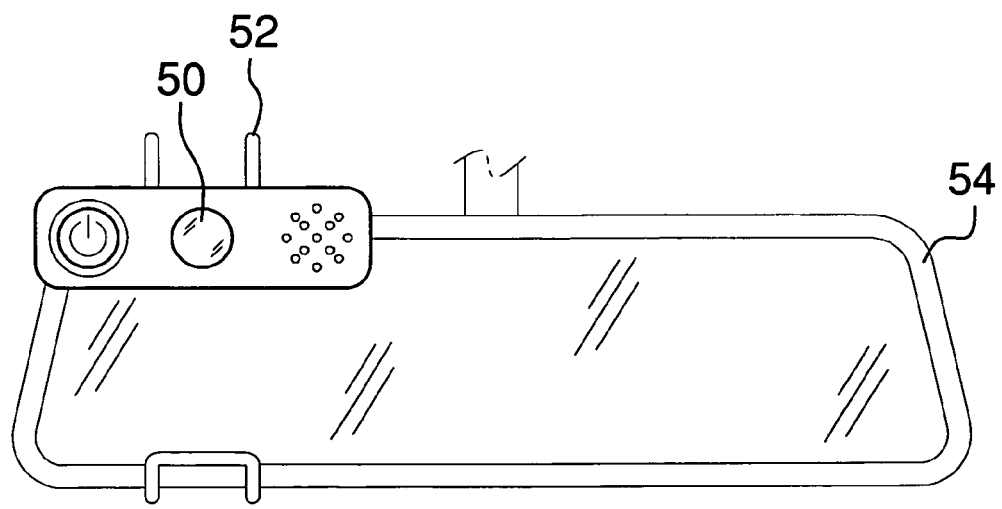
FIG. 8 is a front view of the second embodiment of the present invention.
Figure 9:
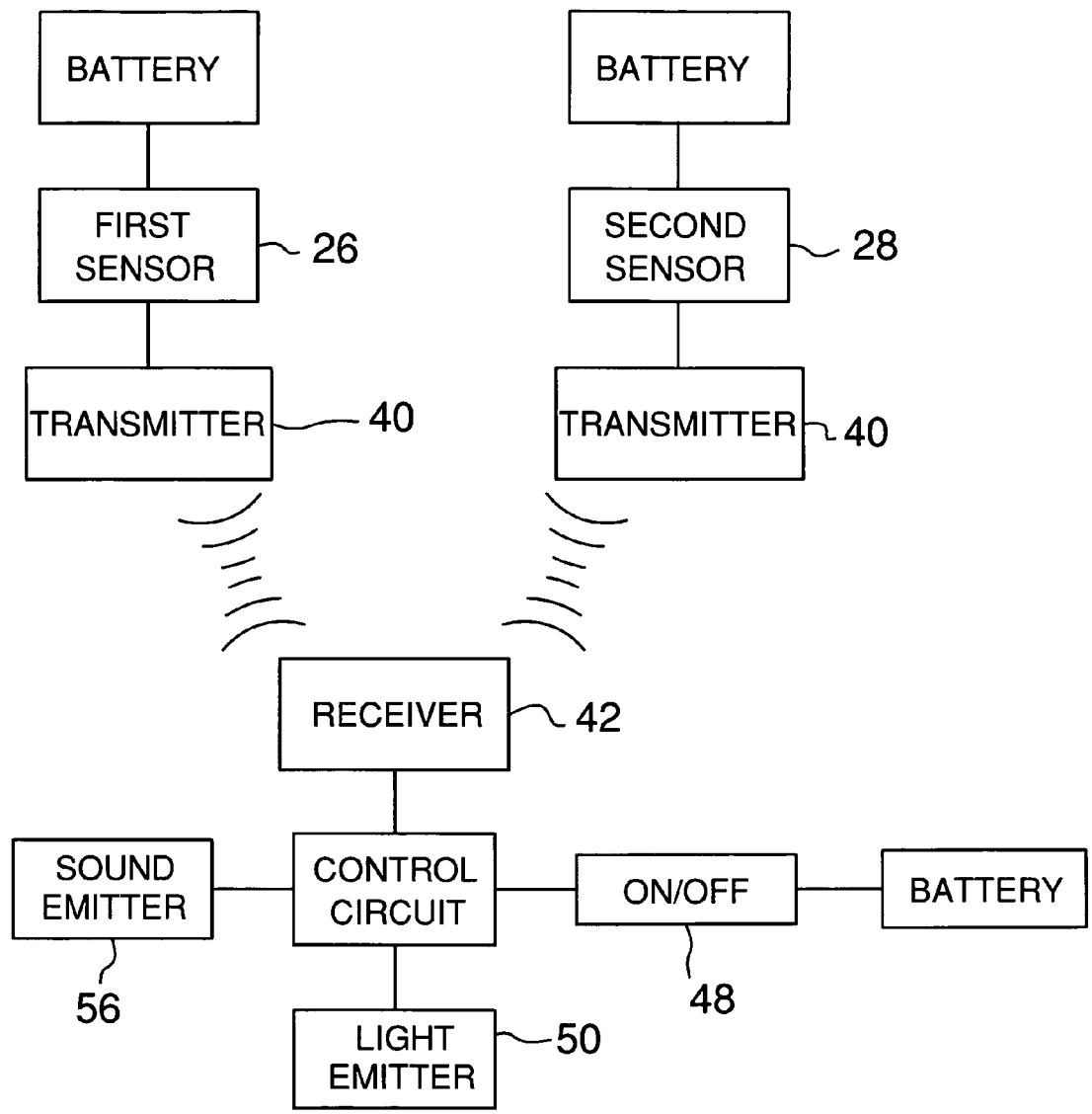
FIG. 9 is a schematic view of the second embodiment of the present invention.

With reference now to the drawings, and in particular to FIGS. 1 through 9 thereof, a new vehicle proximity warning device embodying the principles and concepts of the present invention and generally designated by the reference numeral 10 will be described.

As best illustrated in FIGS. 1 through 9, the vehicle blind spot occupation warning system 10 generally comprises a vehicle 12 that has a front end 14, a rear end 16, a first lateral side 18 and a second lateral side 20. A first rear view mirror 22 is mounted on the first lateral side 18 and a second rear view mirror 24 is mounted on the second lateral side 20.

A pair of heat detecting sensors 26, 28 is provided. Each of the first 18 and second 20 lateral sides has one of the sensors attached thereto either by an adhesive or a mechanical fastener. The sensors 26, 28 are each positioned adjacent to the rear end 16. The heat detecting sensors 26, 28 detect heat from vehicles positioned at least within 30 feet laterally and rearwardly of the first 18 and second 20 lateral sides. The heat detecting sensors 26, 28 may comprise any conventional type of heat detecting means such as infrared heat sensors configured to detect heat greater than 20 degrees Fahrenheit above the ambient temperature or configured to detect a threshold temperature, such as 120 degrees Fahrenheit. This will allow the sensors detecting sensors 26, 28 to detect the heat radiating off of vehicles 8 positioned adjacent to the sensors 26, 28.

A first light emitter 30 is in communication with a first sensor 26 of the pair of heat detecting sensors and emits light when the first sensor 26 detects heat which is above a threshold temperature. A second light emitter 32 is in communication with a second sensor 28 of the pair of heat detecting sensors and emits light when the second sensor 28 detects heat above the threshold temperature. The first light emitter 30 is mounted on the first rear view mirror 22 and the second light emitter 32 is mounted on the second rear view mirror 24. This ensures that a driver in the vehicle 12, when viewing the first 22 or second 24 rear mirrors, will see the first 30 or second 32 light emitter and be aware of another vehicle 8 adjacent to the vehicle 12. The first 30 and second 32 light emitters may be powered by the vehicle' 12 battery 34 or bye removable batteries held within housings 36 of the first 30 and second 32 light emitter.

Each of the first 26 and second 28 sensors includes a transmitter 40 and each of the first 30 and second 32 light emitters includes a receiver 42 to receive a wireless signal from a corresponding one of the first 26 and second 28 sensors. This allows the system 10 to be readily retrofitted to existing vehicles 12 as it does not require hardwiring through the vehicle 12.

A pair of clips 44 is provided. Each of the first 30 and second 32 light emitters has one of the clips 44 attached thereto. The clips 44 releasably secure the first 30 and second 32 light emitters to a corresponding one of the first 22 and second 24 rear view mirrors. A pressure sensitive adhesive 46 may also be positioned on a back side of the housings 36 of first 30 and second 32 light emitters and the adhesive 46 used in conjunction with or instead of the clips 44 to attach the light emitters 30, 32 to the vehicle 12.

An actuator 48 is electrically coupled to the first 30 and second 32 light emitters. The actuator 48 is actuated to turn the first 30 and second 32 light emitters on or off. This may be used when a person is driving on single lane roads or in heavy traffic where oncoming vehicles or a plurality of laterally position vehicles 8 may confuse the system.

A second embodiment is found in FIGS. 7 and 8 and again includes the vehicle 12 and the pair of heat detecting sensors 26, 28. This embodiment, however, may be used within the interior of the vehicle 12 and need only at least one light emitter 50 that is in communication with the heat detecting sensors 26, 28 and emitting light when the first 26 or second 28 sensors detect heat. A clip 52 is attached to the at least one light emitter 50 and the clip 52 is coupled to rear view mirror 54 mounted within the vehicle 12. When a person looks in their interior rear view mirror 54, they will be able to easily see the at least one light emitter 48. Because the at least one light emitter 48 of the second embodiment is positioned within the vehicle 12, it may further include a sound emitter 56 that is in communication with the heat detecting sensors 26, 28 and will emit an audible sound when one of the heat sensors 26, 28 detects heat. The second embodiment also includes the actuator 48 which will be electrically coupled to both of the at least one light emitter 50 and the sound emitter 56 to turn each off when needed. The first embodiment may also include a sound emitter 56 which would be positioned within the vehicle 12 adjacent to the actuator 48.

In use, the heat sensors 26, 28 are placed on the vehicle 12 as described above and in the Figures. When another vehicle 8 approaches the lateral sides 22, 24 of the vehicle 12, the heat sensors 26, 28 will detect the engine heat from that vehicle 8 which will in turn illuminate the corresponding ones of the first 30 and second 32 light emitters or the at least one light emitter 50. The detection of heat will also cause the sound emitter 56 to emit an audible sound.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A warning system to detect vehicles in a driver's blind spot, said warning system including:
   a vehicle having a front end, a rear end, a first lateral side and a second lateral side, a first rear view mirror being mounted on said first lateral side, a second rear view mirror being mounted on said second lateral side;
   a pair of heat detecting sensors, each of said first and second lateral sides having one of said heat detecting sensors attached thereto, each of said heat detecting sensors being positioned adjacent to said rear end, said heat detecting sensors detecting heat from vehicles positioned at least within 30 feet laterally and rearwardly of said first and second lateral sides; and
   a first light emitter being in communication with a first sensor of said pair of heat detecting sensors and emitting light when said first sensor detects heat, a second light emitter being in communication with a second sensor of said pair of heat detecting sensors and emitting light when said second sensor detects heat, said first light emitter being mounted on said first rear view mirror, said second light emitter being mounted on said second rear view mirror.

2. The system according to claim 1, wherein each of said first and second sensors including a transmitter, each of said first and second light emitters including a receiver to receive a wireless signal from a corresponding one of said first and second sensors.

3. The system according to claim 1, further including a pair of clips, each of said first and second light emitters having one of said clips attached thereto, said clips releasably securing said first and second light emitters to a corresponding one of said first and second rear view mirrors.

4. The system according to claim 1, further including an actuator being electrically coupled to said first and second light emitters, said actuator being actuated to turn said first and second light emitters on or off.

5. A warning system to detect vehicles in a driver's blind spot, said warning system including:
   a vehicle having a front end, a rear end, a first lateral side and a second lateral side, a first rear view mirror being mounted on said first lateral side, a second rear view mirror being mounted on said second lateral side;
   a pair of heat detecting sensors, each of said first and second lateral sides having one of said heat detecting sensors attached thereto, each of said heat detecting sensors being positioned adjacent to said rear end, said heat detecting sensors detecting heat from vehicles positioned at least within 30 feet laterally and rearwardly of said first and second lateral sides;
   a first light emitter being in communication with a first sensor of said pair of heat detecting sensors and emitting light when said first sensor detects heat, a second light emitter being in communication with a second sensor of said pair of heat detecting sensors and emitting light when said second sensor detects heat, said first light emitter being mounted on said first rear view mirror, said second light emitter being mounted on said second rear view mirror;
   each of said first and second sensors including a transmitter, each of said first and second light emitters including a receiver to receive a wireless signal from a corresponding one of said first and second sensors;
   a pair of clips, each of said first and second light emitters having one of said clips attached thereto, said clips releasably securing said first and second light emitters to a corresponding one of said first and second rear view mirrors; and
   an actuator being electrically coupled to said first and second light emitters, said actuator being actuated to turn said first and second light emitters on or off.

6. A warning system to detect vehicles in a driver's blind spot, said warning system including:
   a vehicle having a front end, a rear end, a first lateral side and a second lateral side, a first rear view mirror being mounted on said first lateral side, a second rear view mirror being mounted on said second lateral side;
   a pair of heat detecting sensors, each of said first and second lateral sides having one of said heat detecting sensors attached thereto, each of said heat detecting sensors being positioned adjacent to said rear end, said heat detecting sensors detecting heat from vehicles positioned at least within 30 feet laterally and rearwardly of said first and second lateral sides;
   at least one light emitter being in communication with said heat detecting sensors and emitting light when said first or second sensor detects heat; and
   a clip being attached to said at least one light emitter, said clip being coupled to rear view mirror mounted within the vehicle.

7. The system according to claim 6, wherein each of said first and second sensors including a transmitter, said at least one light emitter including a receiver to receive a wireless signal from said first and second sensors.

8. The system according to claim 6, further including a sound emitter being in communication with said heat detecting sensors and emitting an audible sound when one of said heat detecting sensors detects heat.

9. The system according to claim 8, further including an actuator being electrically coupled to said at least one light emitter and said sound emitter to turn said at least one light emitter and said sound emitter on or off.

10. The system according to claim 9, wherein each of said first and second sensors including a transmitter, said at least one light emitter including a receiver to receive a wireless signal from said first and second sensors.

* * * * *